US012571257B2

(12) United States Patent
Martin et al.

(10) Patent No.: US 12,571,257 B2
(45) Date of Patent: Mar. 10, 2026

(54) DOCK GATE BARRIER SYSTEM

(71) Applicant: A-SAFE HQ LTD, Elland (GB)

(72) Inventors: John Graham Martin, Elland (GB); Matthew Lee Scothern, Elland (GB)

(73) Assignee: A-SAFE HQ LTD, Elland (GB)

( * ) Notice: Subject to any disclaimer, the term of this patent is extended or adjusted under 35 U.S.C. 154(b) by 0 days.

(21) Appl. No.: 18/722,617

(22) PCT Filed: Dec. 22, 2022

(86) PCT No.: PCT/GB2022/053363

§ 371 (c)(1),
(2) Date: Jun. 21, 2024

(87) PCT Pub. No.: WO2023/118882

PCT Pub. Date: Jun. 29, 2023

(65) Prior Publication Data

US 2025/0052114 A1 Feb. 13, 2025

(30) Foreign Application Priority Data

Dec. 24, 2021 (GB) .................................... 2118994

(51) Int. Cl.
*E06B 11/02* (2006.01)

(52) U.S. Cl.
CPC .................................. *E06B 11/027* (2013.01)

(58) Field of Classification Search
CPC ......... E06B 11/027; E01F 13/06; E05B 77/04
See application file for complete search history.

(56) References Cited

U.S. PATENT DOCUMENTS 5,299,386 A * 4/1994 Naegelli ............ B65G 69/2876 49/27
5,459,963 A * 10/1995 Alexander ................ E01F 1/00 49/34
7,739,834 B2 * 6/2010 Stoffels ................... E01F 13/06 49/233
9,217,229 B2 * 12/2015 Ball ........................ E01F 13/12
9,822,501 B2 * 11/2017 Younce ................... E01F 13/10
10,227,742 B2 * 3/2019 Neusch ................. E01F 13/024
(Continued)

FOREIGN PATENT DOCUMENTS

DE 8802125 A1 6/1988
DE 8802125 U1 6/1988
(Continued)

*Primary Examiner* — Daniel J Troy
*Assistant Examiner* — Susan M. Heschel
(74) *Attorney, Agent, or Firm* — LEYDIG, VOIT & MAYER, LTD.

(57) ABSTRACT

A dock gate barrier system includes: a barrier with first and second ends with a central axis extending therebetween, and a coupling defining a passage; and a support member, from which extends a hitch pin, which extends along a longitudinal axis, and can enter and extend into the coupling passage. The hitch pin and the passage are configured such that: in a first configuration, the hitch pin can enter into/withdraw from, the passage; and in a second configuration, in response to a load being applied to the barrier causing it to bend, the hitch pin is engaged with the coupling to thereby lock the coupling relative to the hitch pin and thereby lock the barrier member to the first support member.

15 Claims, 4 Drawing Sheets

(56) References Cited

U.S. PATENT DOCUMENTS

| | | | | |
|---|---|---|---|---|
| 10,900,181 B2 * | 1/2021 | Neusch | .................. | E01F 13/06 |
| 10,907,314 B2 * | 2/2021 | Satrom | ..................... | E05F 1/10 |
| 11,214,934 B2 * | 1/2022 | Matthews | ............... | E01F 13/12 |
| 2019/0218730 A1 | 7/2019 | Satrom et al. | | |

FOREIGN PATENT DOCUMENTS

| | | | |
|---|---|---|---|
| DE | 202005011335 U1 | 9/2005 |
| EP | 0990736 A1 | 4/2000 |
| GB | 2493353 A | 2/2013 |
| WO | WO 2017182842 A1 | 10/2017 |

* cited by examiner

DOCK GATE BARRIER SYSTEM

CROSS REFERENCE TO RELATED APPLICATIONS

This application is a U.S. National Phase application under 35 U.S.C. § 371 of International Application No. PCT/GB2022/053363, filed on Dec. 22, 2022, and claims benefit to British Patent Application No. GB 2118994.9, filed on Dec. 24, 2021. The International Application was published in English on Jun. 29, 2023 as WO 2023/118882 A1 under PCT Article 21(2).

FIELD

The present disclosure relates to a barrier system. In particular the present disclosure relates to a dock gate barrier system.

BACKGROUND

Safety barriers are provided in many different locations. For example a barrier may be provided in a warehouse or on a manufacturing shop floor to prevent unwanted contact between vehicles and people and/or equipment. Through necessity, the barrier should be continuous. However, in places, a gate section (e.g. a dock gate) may be required to allow users and/or vehicles to pass from one side of the barrier to the other.

A problem with conventional dock gates is that they introduce an inherent weakness into the barrier, as they must be easily openable and closable. This generally results in the gate being too easily opened in the event of a vehicle colliding with it. This issue may be resolved by applying a lock to hold the gate shut, but this introduces the problem of users having to disengage a lock before opening the gate and being responsible for locking the gate again after passing through. Human error may result in the gate not being secured properly, which risks an accident happening if a collision occurs.

Hence the present inventors have recognized that a dock gate for a barrier system which is opened without the need to disengage a catch or lock, and provides an impact resistant barrier which a user does not need to secure after it is closed, is highly desirable.

SUMMARY

In an embodiment, the present disclosure provides a dock gate barrier system that includes: a barrier member having: a first end and a second end with a central axis extending therebetween along a length of the barrier member, and a coupling, which defines a coupling passage with an inlet; and a first support member, from which extends a hitch pin, which extends along a longitudinal axis, the hitch pin configured to enter the passage at the inlet and extend into the coupling passage. The hitch pin and the coupling passage are configured such that: in a first configuration, the hitch pin is operable to be entered into, and withdrawn from, the coupling passage; and in a second configuration, in response to a load being applied to the barrier member causing it to bend along its central axis, the hitch pin is engaged with the coupling to thereby lock the coupling relative to the hitch pin and thereby lock the barrier member to the first support member.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

Examples of the present disclosure will now be described with reference to the accompanying drawings, in which.

DETAILED DESCRIPTION

Figure 1:
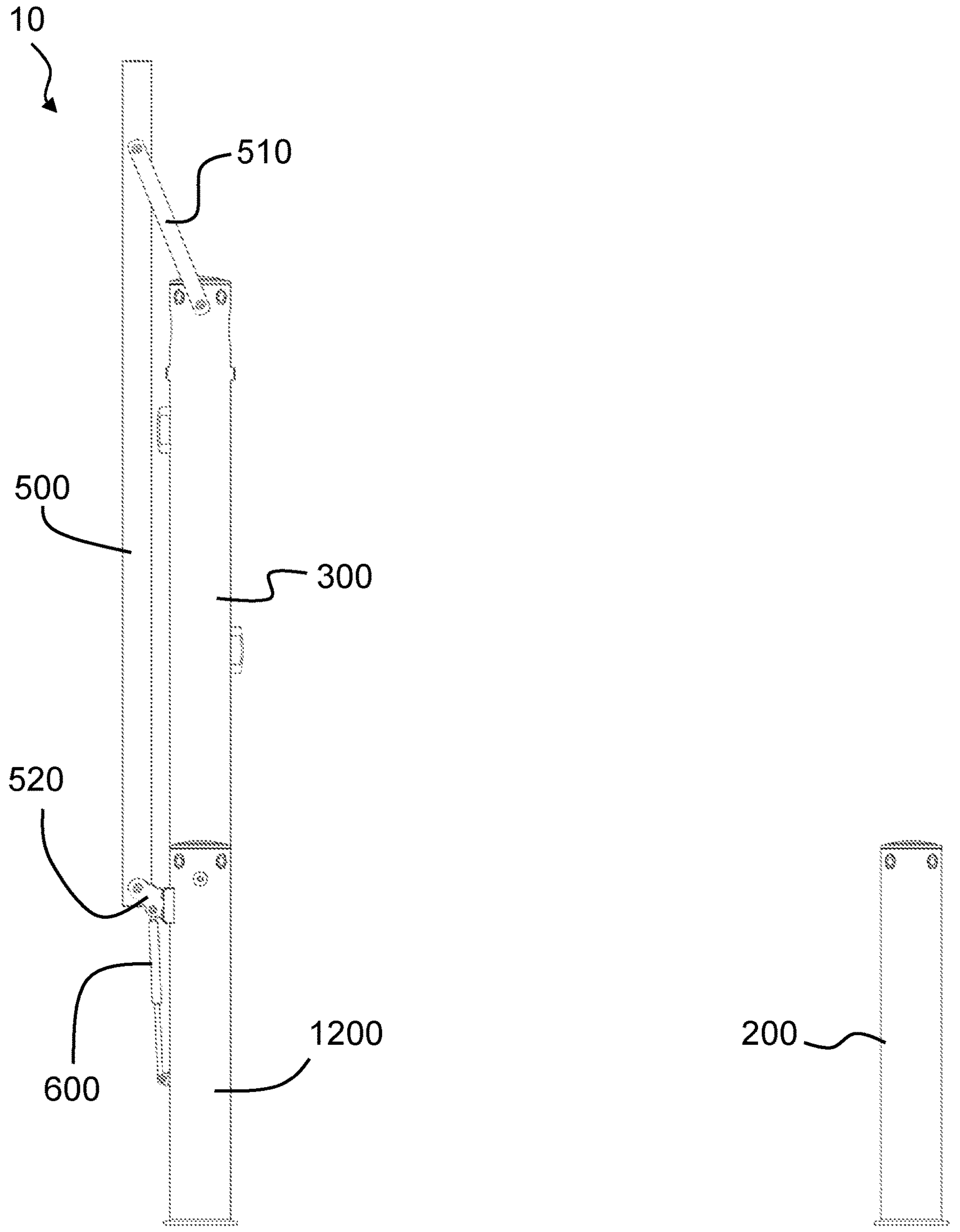
FIG. 1 shows side view of an exemplary embodiment of a barrier system implemented according to an aspect of the present disclosure when open.

An aspect of the present disclosure provides a dock gate barrier system comprising: a barrier member having a first end and a second end with a central axis extending therebetween along the length of the barrier member. The barrier member may further comprise a coupling which defines a passage with an inlet; a first support member from which extends a hitch pin which extends along a longitudinal axis, the hitch pin configured to enter the passage at the inlet and extend into the passage. The hitch pin and coupling passage may be configured such that: in a first configuration the hitch pin is operable to be entered into, and withdrawn/removed from, the coupling passage. In the first configuration, the coupling 400 (i.e. passage) is operable to entered by the hitch pin 210 and to be moved free of the hitch pin 210. In a second configuration, in response a load being applied to the barrier member causing it to bend along its central axis, the hitch pin is engaged with the coupling to thereby lock the coupling relative to the hitch pin and thereby lock the barrier member to the first support member.

The relative positions of the hitch pin and coupling passage in the first configuration may be different to the relative positions of the hitch pin and coupling passage in the second configuration.

The coupling may be operable, in response a load being applied to the barrier member, to move relative to the hitch pin in a direction at an angle to the longitudinal axis of the hitch pin to thereby change the relative positions of the hitch pin and coupling passage.

The coupling may be pivotable relative to the hitch pin around the longitudinal axis of the hitch pin to thereby change the relative positions of the hitch pin and coupling passage.

The hitch pin may be fixed relative to the first support member.

The coupling may be fixed relative to the barrier member.

The passage of the coupling may extend from the inlet to an outlet (412).

In the first configuration, a clearance and/or sliding fit may be maintained between the hitch pin and the passage.

In the second configuration, a side of the hitch pin may frictionally engage with a side of the passage.

The hitch pin may comprise: a head end; a stem portion, which extends along the longitudinal axis from the head end; the head end having an extension which overhangs the stem portion such that: in the first configuration, the relative position of the coupling passage and the extension is such that the extension is operable to be entered into, and withdrawn from, the coupling passage. Put another way, in the first configuration, the coupling 400 (i.e. passage) is operable to entered by (i.e. allow entry of) the extension and to be moved free of the extension. In the second configuration, the extension is engaged with the coupling to thereby prevent the hitch pin from being withdrawn from the coupling passage.

In the second configuration, the extension may be operable to engage with the coupling around the outlet to prevent the coupling from moving past the extension, such that the coupling is prevented from disengaging from the hitch pin 210.

In the second configuration, the extension may be operable to hook onto the coupling to prevent the head end of the hitch pin from moving past the outlet such that the coupling is prevented from disengaging from the hitch pin 210.

The passage may be larger than the hitch pin stem portion and the head end of the hitch pin.

The passage and hitch pin may extend at the same angle to the barrier member central axis.

The passage and hitch pin may extend perpendicular to the barrier member central axis.

The hitch pin may extend from a stop/rest, which in turn extends from the first support member, wherein the stop/rest is operable for the barrier member to rest upon.

The hitch pin may extend upwards from a substrate and the barrier member may be configured to travel down so the hitch pin is received in the coupling passage and travel up so the hitch pin is withdrawn/removed from the coupling passage.

The barrier member may be hollow along its length.

The dock gate barrier system may further comprise: a second support member, spaced apart from the first support member, the barrier member pivotably mounted to the second support member at its second end such that the barrier member is operable to: pivot relative to the second support member to move the first end of the barrier member towards the first support member and enter the hitch pin in the coupling passage; and pivot relative to the second support member to move the first end of the barrier member away from the first support member to withdraw/remove the hitch pin from the coupling passage.

The first support member may comprise a pair of spaced apart posts, the barrier member, the hitch pin located between the posts, and the barrier operable to be located between the two posts; and/or the second support member may comprise a pair of spaced apart posts, the barrier member being pivotably mounted to one or more of the second support member posts.

The dock gate barrier system may further comprise: a handrail, pivotably coupled to the barrier member, and coupled to the barrier member such that when the barrier member is pivoted relative to the second support member the handrail remains parallel to the barrier member; and such that when the barrier member is pivoted away from the first support member, the distance between the handrail and barrier member reduces; and such that when the barrier member is pivoted toward the first support member, the distance between the handrail and barrier member increases.

The dock gate barrier system may further comprise a pneumatic support arm coupled between the handrail and the barrier member configured to limit the pivoting speed of the barrier member.

There may also be provided a method of operation of a dock gate barrier system, the dock gate barrier system comprising: a barrier member having a first end and a second end with a central axis extending therebetween along the length of the barrier member; the barrier member further comprising a coupling which defines a passage with an inlet; a first support member from which extends a hitch pin, which extends along a longitudinal axis, the hitch pin configured to enter the passage at the inlet and extend into the passage. In a first mode of operation the barrier system is in a first configuration in which the hitch pin is operable to be entered into, and withdrawn/removed from, the coupling passage. In a second mode of operation in response a load being applied to the barrier member causing it to bend along its central axis, the barrier system is in a second configuration in which the hitch pin is engaged with the coupling to thereby lock the coupling relative to the hitch pin and thereby lock the barrier member to the first support member.

Hence there is provided a dock gate barrier system with a catch configured to be self locking in the event of an impact, for example an impact from a vehicle. Thus a dock gate barrier system according to the present disclosure provides a solution which is inherently safer than those of the prior art as no positive action by the user is required to lock the barrier.

Aspects of the present disclosure are further elucidated below in relation to the figures which are directed to exemplary embodiments of the dock gate barrier system and method of operation thereof.

Figure 2:
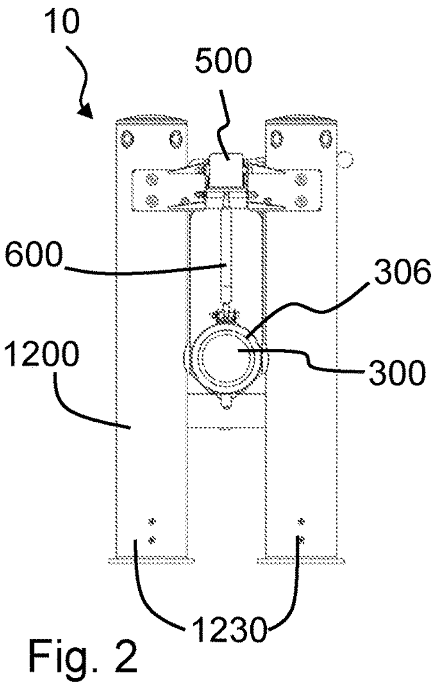
FIG. 2 shows a hinge end of the barrier system when closed.
Figure 3:
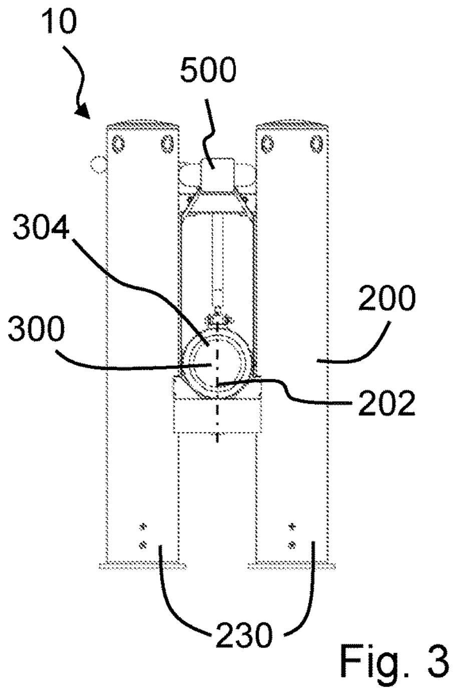
FIG. 3 shows a catch end of the barrier system when closed.
Figure 4:
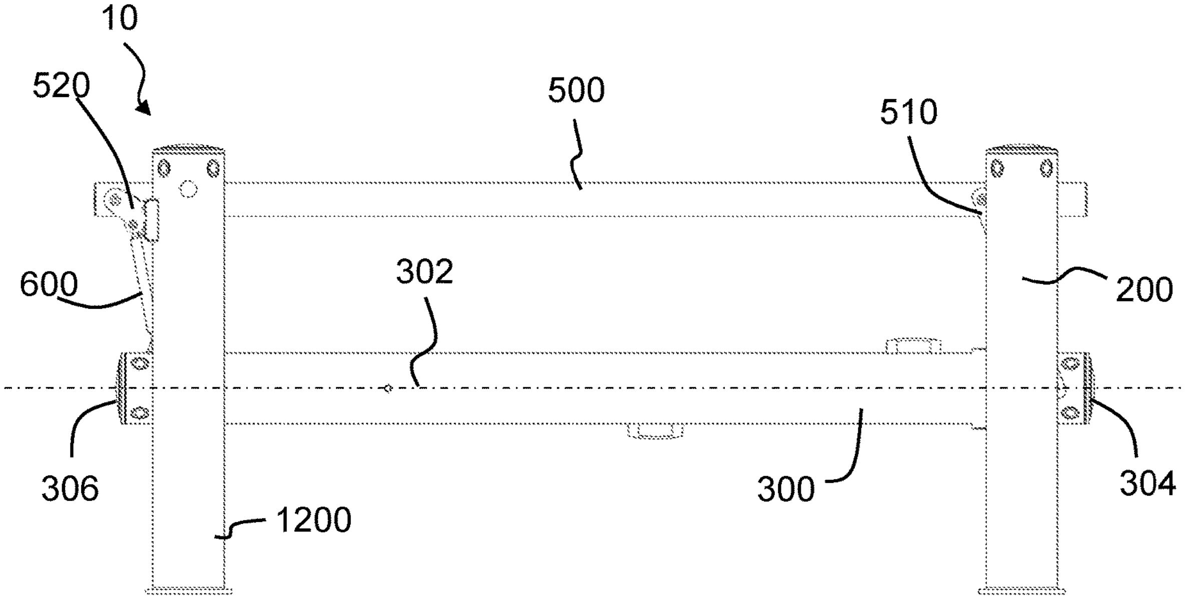
FIG. 4 shows side view of the barrier system when closed.
Figure 6:
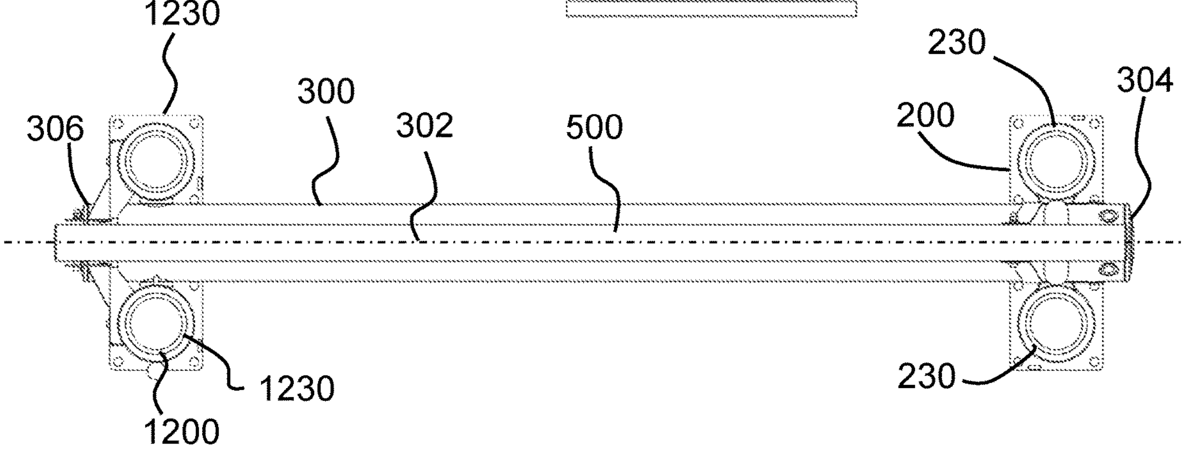
FIG. 6 shows plan view of the barrier system in the first configuration.

FIGS. 1 to 4 show different views and states of an example of the dock gate barrier system 10 of the present disclosure. FIG. 1 shows a side view of the example of the dock gate barrier system 10 when open. FIGS. 2 to 4 show the dock gate barrier system 10 when closed. FIG. 2 shows a hinge end of the dock gate barrier system 10 and FIG. 3 shows a catch end of the dock gate barrier system 10. FIG. 4 shows a side view of the dock gate barrier system 10 when closed. FIG. 6 shows a plan view of the barrier system when closed.

The dock gate barrier system 10 comprises a barrier member 300 having a first end 304 (e.g. a catch end) and a second end 306 (e.g. a hinge end) with a central axis 302 extending between the first end 304 (e.g. the catch end) and the second end 306 (e.g. the hinge end) along the length of the barrier member 300. The barrier member 300 may be hollow along its length. The barrier member 300 may be closed at the first end 304 and/or second end 306, for example, with a cap. The barrier member 300 may be of a fixed length.

Figure 5:
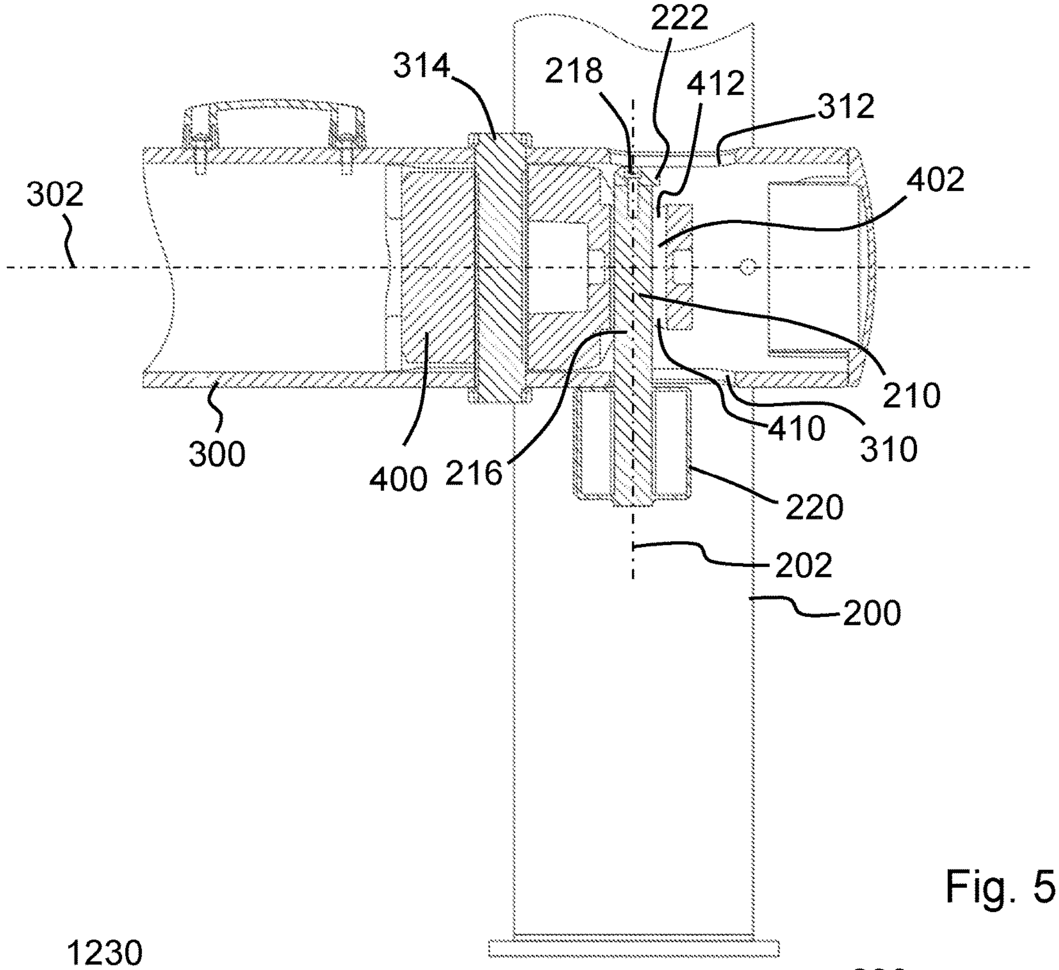
FIG. 5 shows an enlarged and sectional view of an exemplary embodiment of the catch end of the barrier system in a first configuration.
Figure 7:
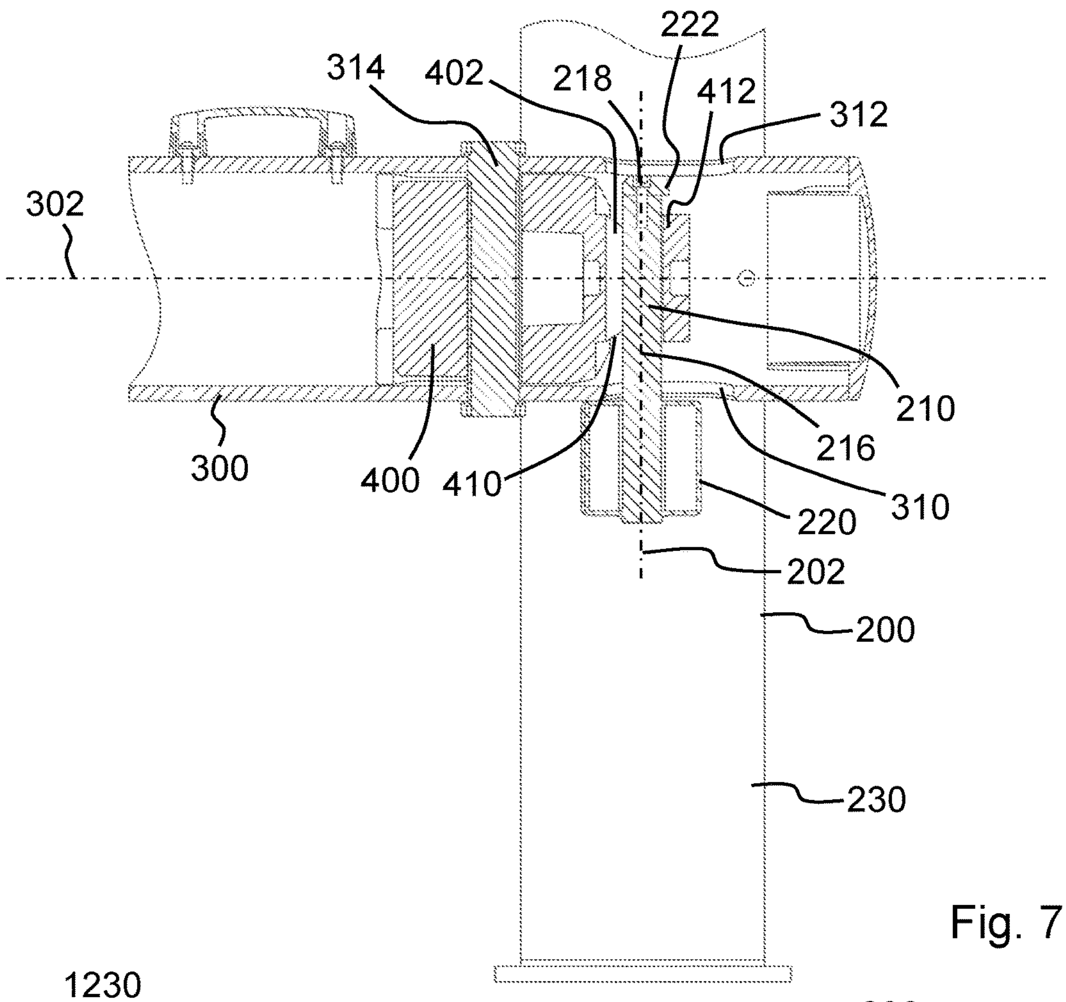
FIG. 7 shows an enlarged and sectional view of an exemplary embodiment of the catch end of the barrier system in a second configuration.

As best shown in FIGS. 5 and 7, which show enlarged sectional views of a part of the barrier system 10, the barrier member 300 further comprises a coupling 400. As shown in the figures, the coupling 400 may be located within the barrier member 300. The coupling 400 may be provided as a plug of material which sits within the barrier member 300. The coupling 400 may be fixed relative to the barrier member 300. For example, the coupling 400 may be fixed relative to the barrier member 300 by a pin 314 which extends through the barrier member 300 and through the coupling 400 to thereby fix the coupling 400 to the barrier member 300.

The coupling defines a passage 402 with an inlet 410. Hence the inlet 410 is an aperture which provides an opening into the passage 402. In some examples the passage 402 extends at least some of the way across the width of the connector 400. In other examples, as shown in the figures, the passage extends from one side of the connector 400 (at the inlet aperture 410) to an opposing side of the connector 400 to an outlet aperture 412. That is to say, the passage 402 of the coupling 400 may extend from the inlet 410 to the outlet 412 through the connector 400.

In examples in which the coupling 400 is located within the barrier member 300, a first aperture 310 is provided in the wall of the barrier member 300, which corresponds to the position of the inlet 410. A second aperture 312 may be provided in the wall of the barrier member 300, which corresponds to the position of the outlet 412. Hence in use, the hitch pin 210 passes through the first aperture 310, into the barrier member 300, before entering the passage 402.

The dock gate barrier system 10 may also comprise a first support member 200 from which extends a hitch pin 210, the hitch pin 210 extending along a longitudinal axis 202. The hitch pin 210 is configured to enter the passage 402 at the inlet 410 and extend into the passage 402. The hitch pin 210 may be fixed relative to the first support member 200.

As shown in FIGS. 1, 2, 4, 6, and 8 the dock gate barrier system 10 may further comprise a second support member 1200, spaced apart from the first support member 200. The barrier member 300 may be pivotably mounted to the second support member 1200 at its second end 306. That is to say, the barrier member 300 is hinged relative to the second support member 1200 towards its second end 306 (the hinge end). The second support member 1200 may comprise a pair of spaced apart posts 1230, and the barrier member 300 may be pivotably mounted (e.g. hinged) to one or more of the second support member posts 1230 at its hinge end.

The first support member 200 may comprise a post 200, or as shown in the figures, a pair of spaced apart posts 230. The hitch pin 210 is coupled to the post 230 (or posts 230). The hitch pin 210 may extend from a stop/rest 220, which in turn extends from the first support member 200 (e.g. from a post 230, or from two posts 230). The stop/rest 220 may be operable/configured for the barrier member 300 to rest upon. The stop/rest 220 may extend between the posts 230, with the hitch pin 210 extending from the stop/rest 220, and spaced apart from the posts 230. Hence the hitch pin 210 may be located between the posts 230, and the barrier operable to be located between the two posts 230. As shown in FIGS. 4, 5, the hitch pin 210 may extend upwards (for example vertically and/or in an arc) from (e.g. relative to) a substrate (for example, the ground on which the first support 200 and second support 1200 extend).

Hence the barrier member 300 is operable to pivot relative to the second support member 1200 to move the first end 304 of the barrier member 300 towards the first support member 200 and enter the hitch pin 210 in the coupling passage 402. Additionally the barrier member 300 is operable to pivot relative to the second support member 1200 to move the first end 304 of the barrier member 300 away from the first support member 200 to draw the coupling passage 402 away from being around the hitch pin 210.

When the hitch pin 210 is entered in the coupling passage 402, the passage 402 and hitch pin 210 may extend at the same angle to the barrier member central axis 302. For example, the passage 402 and hitch pin 210 extend perpendicular to the barrier member central axis 302.

The passage 402 may have constant diameter along its length, for example between the inlet 410 and outlet 412. In an alternative example the passage 402 may vary in diameter along its length, for example being widest at the inlet 410 and outlet 412, and narrowest towards or at the centre point along the passage 420.

The dock gate barrier system 10 may further comprise a handrail 500. As shown in FIGS. 1 to 4, the handrail 500 may be pivotably coupled to the barrier member 300.

The handrail 500 may be pivotably coupled to the barrier member 300 by a first arm 510 and a second arm 520, the arms 510, 520 being of the same length and spaced apart along the length of the barrier member 300 and handrail 500. With this arrangement, the handrail 500 may be pivotably coupled to the barrier member 300 such that when the barrier member 300 is pivoted relative to the second support member 1200 the handrail remains parallel to the barrier member 300. With this arrangement the handrail 500 may be pivotably coupled to the barrier member 300 such that when the barrier member 300 is pivoted away from the first support member 200, the distance between the handrail 500 and barrier member 300 reduces. With this arrangement, the handrail 500 may be pivotably coupled to the barrier member 300 such that when the barrier member 300 is pivoted toward the first support member 200, the distance between the handrail 500 and barrier member 300 increases.

As shown in FIGS. 1 and 4, the dock gate barrier system 10 may further comprise a pneumatic support arm 600 coupled between the handrail 500 and the barrier member 300 configured to limit the pivoting speed of the barrier member 300.

The barrier member 300 is mounted so as to move the first end 304 (catch end) down (for example travelling vertically and/or in an arc), travelling from the position in FIG. 1 to the position in FIG. 4 so the hitch pin 210 is received in the coupling passage 402. The barrier member 300 is mounted so as to move the first end 304 (catch end) up (for example vertically and/or in an arc), travelling from the position in FIG. 4 to the position in FIG. 1 so the hitch pin 210 is withdrawn from the coupling passage 402. That is to say, the barrier member 300 is mounted so as to move the first end 304 (catch end) up (for example vertically and/or in an arc), travelling from the position in FIG. 4 to the position in FIG. 1 so the hitch pin 210 is removed from (i.e. exits, leaves) the coupling passage 402.

The dock gate barrier system 10 has a first configuration and a second configuration. The first configuration is illustrated in FIGS. 2 to 6 in which the dock gate barrier system 10 is operating as assembled as an openable barrier. Hence as shown in FIG. 5, in the first configuration the hitch pin 210 and coupling passage 402 are configured such that the hitch pin 210 is operable to be entered into, and withdrawn (i.e. removed) from, the coupling passage 402. That is to say, in the first configuration, the hitch pin 210 is operable to be entered into, and released from, the coupling 400. In the first configuration, the coupling 400 (i.e. passage 402) is operable to entered by the hitch pin 210 and to be moved free of the hitch pin 210. In the first configuration a clearance and/or sliding fit is maintained between the hitch pin 210 and the passage 402.

Figure 8:
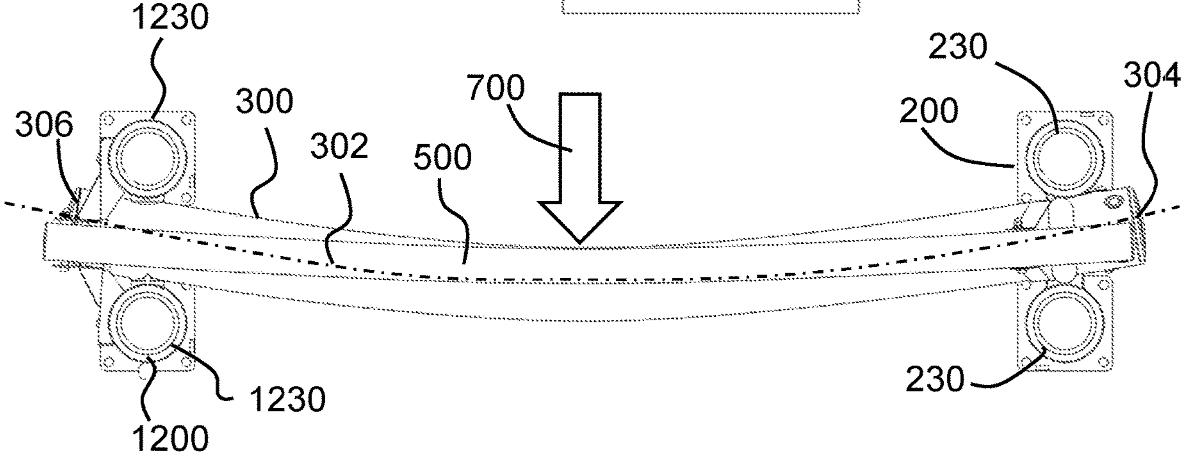
FIG. 8 shows plan view of the barrier system in the second configuration.

The second configuration is illustrated in FIGS. 7 to 8, in which a force/load (for example an impact from a vehicle) has been applied to the barrier member 300. In the second configuration, in response a load being applied to the barrier member 300 causing it to bend (e.g. deform) along its length (i.e. along its central axis 302), the hitch pin 210 is engaged with the coupling 400 to thereby lock the coupling 400 relative to the hitch pin 210 and thereby lock the barrier member 300 to the first support member 200. That is to say, in the second configuration the hitch pin 210 is engageable with the coupling 400 to lock the hitch pin 210 relative to the coupling 400.

The coupling 400 is operable to move relative to the hitch pin 210 in a direction at an angle (e.g. perpendicular) to the longitudinal axis 202 of the hitch pin 210 to thereby change the relative positions of the hitch pin 210 and coupling passage 402. Additionally or alternatively, the coupling 400 is pivotable (e.g. rotatable) relative to the hitch pin 210 around the longitudinal axis 202 of the hitch pin 210 to thereby change the relative positions of the hitch pin 210 and coupling passage 402. That is to say, when the barrier member 300 is deformed (i.e. bent) along its length, as shown in FIG. 8, the coupling 400 is displaced as the barrier member 300 is bent. Hence the relative positions of the hitch pin 210 and coupling passage 402 in the first configuration is different to the relative positions of the hitch pin 210 and coupling passage 402 in the second configuration. Hence, in the second configuration a side of the hitch pin 210 frictionally and/or mechanically engages with a side of the passage 402.

As shown in FIGS. 5, 7, the hitch pin 210 may comprise a head end 218 and a stem portion 216 which extends along the longitudinal axis 202 from the head end 218 to join with the first support member 200. The head end 218 may have an extension 222 (e.g. a flange and/or lip) which overhangs (e.g. projects beyond) the stem portion 216. In such an example, in the first configuration (as shown in FIG. 5) the relative position of the coupling passage 402 and the extension 222 is such that the extension 222 is operable to be entered into, and withdrawn (i.e. removed) from the coupling passage 402. In the same example, in the second configuration (as shown in FIG. 7) the extension 222 is engaged with (e.g. mechanically engaged with) the coupling 400 to thereby prevent the hitch pin 200 from being withdrawn from the coupling passage 402. That is to say, in the second configuration the extension 222 is engaged with (e.g. mechanically engaged with) the coupling 400 to thereby prevent the coupling 400 from moving free of the hitch pin 200.

As can be seen from the figures, in the second configuration, the coupling 400 in FIG. 7 has moved to the left of the figure relative to its position in the first configuration shown in FIG. 5.

Hence in such an example, in the second configuration (as shown in FIG. 7) since the extension 222 overhangs the stem portion 216, the extension 222 is operable to mechanically engage with the coupling 400 around the outlet 412 to prevent the coupling 400 from moving past the extension 222, and thereby prevent the hitch pin 210 from being withdrawn from the coupling 400 (i.e. preventing the coupling 400 from moving free of the hitch pin 210), and thereby preventing the barrier member 300 from pivoting upwards away from the first support member 200.

Hence in such an example, in the second configuration (as shown in FIG. 7) the extension 222 is operable to hook onto the coupling 400 at the outlet 412 to prevent the head end 218 of the hitch pin 210 from moving past the outlet 412, and thereby prevent the hitch pin 210 from being withdrawn from the coupling 400 (i.e. preventing the coupling 400 from releasing the hitch pin 210), and thereby preventing the barrier member 300 from pivoting upwards away from the first support member 200 to keep the dock gate shut.

The passage 402 is larger in cross-section than the hitch pin stem portion 216 and the head end 218 of the hitch pin 210.

The barrier member 300, support members 200, 1200 and/or posts 230, 1230 may comprise (e.g. be manufactured from) a polymer, for example polyurethane. The barrier member 300, support members 200, 1200 and/or posts 230, 1230 may be provided as hollow tubes, for example cylindrical tube sections. The barrier member 300, support members 200, 1200 and/or posts 230, 1230 may be provided as hollow tube sections having a polygonal or other shaped cross-section. The barrier member 300, support members 200, 1200 and/or posts 230, 1230 may be manufactured from a resilient deformable material.

Hence the dock gate barrier system 10 has a first mode of operation (e.g. a first mode of use) and a second mode of operation (e.g. a second mode of use).

The first mode of operation is illustrated in FIGS. 5, 6. FIG. 5 shows an enlarged view of the catch end of the barrier system in a first configuration. FIG. 6 shows plan view of the barrier system in the first configuration.

In the first mode of operation, as illustrated in FIGS. 5, 6, the dock gate barrier system 10 is in the first configuration wherein the hitch pin 210 is operable to be entered into, and withdrawn from, the coupling passage 402 without hindrance. That is to say, the relative locations or (i.e. spacing between) the hitch pin 210 and passage 402 of the connector 400 are such that the first/catch end 304 of the barrier member 300 can be moved (i.e. lifted) free of the hitch pin 210 and moved (i.e. lowered) to couple with the hitch pin 210.

That is to say, in the first mode of operation when the dock gate barrier system 10 is in the first configuration the relative locations or (i.e. spacing between) the hitch pin 210 and passage 402 of the connector 400 are such the barrier member 300 is operable to pivot about its connection with the second support member 1200, so that the first/catch end 304 of the barrier member 300 is operable to lift upwards, moving the coupling 400 free of the hitch pin 210. Additionally, when the dock gate barrier system 10 is in the first configuration the relative locations or (i.e. spacing between) the hitch pin 210 and passage 402 of the connector 400 are such the barrier member 300 is operable to pivot about its connection with the second support member 1200, so that the first/catch end 304 of the barrier member 300 is operable to be lowered downwards, moving the coupling 400 to engage with the hitch pin 210.

Hence in the first configuration, the position of the connector 400, and hence the passage 402, relative to the hitch pin 210 is arranged so that a clearance fit and/or a sliding fit are maintained between the hitch 210 and the passage 402 so that the connector 400 is operable to be moved relative to the hitch pin 210, so the hitch pin 210 may be received in the passage 402 (when the barrier member 300 is lowered/closed) and withdrawn from the passage 402 (when the barrier member 300 is raised/opened).

The second mode of operation is illustrated in FIGS. 7, 8. FIG. 7 shows an enlarged view of the catch end of the barrier system in a second configuration and FIG. 8 shows plan view of the barrier system in the second configuration.

The second mode of operation is triggered in response a load being applied to the barrier member 300 (for example as illustrated by arrow 700 in FIG. 8) causing it to bend (e.g. deform) along its central axis 302 (e.g. along its length). The load 700 may be a vehicle or other moving mass, for example an object which collides with the barrier member 300. In response to the impact, the barrier system transitions from the first mode of operation, in which the barrier system in in the first configuration, to the second mode of operation in which the barrier system is in the second configuration. That is to say, the load 700 being applied to the barrier member 300 causes it to bend (e.g. deform) along its central axis 302 (e.g. along its length) and causes the coupling 400 to move relative to the hitch pin 210 (for example, as shown in the figures, the coupling 400 in FIG. 7 has moved to the left of the figure relative to its position shown in FIG. 5) and hence causes the passage 402 to move relative to the hitch pin 210 to thereby lock the coupling 400 relative to the hitch pin 210.

That is to say, when the load 700 being is applied to the barrier member 300 causing it to bend (e.g. deform) along its central axis 302 (e.g. along its length), and because the hitch pin 210 (for example the extension 222 of the hitch pin 210) acts as a mechanical anchor to prevent the coupling 400 from moving past the hitch pin, the barrier 300 is fixed relative to the first support member 200.

This is advantageous because when an object collides with the barrier member 300, there is a risk the barrier member 300 is forced move upwards, pivoting about its connection with the second support member 1200, forcing the coupling 400 to slide relative to the hitch pin 210. However, the size of the hitch pin 210 and passage 402 are chosen such that for a given force and/or amount of deformation of the barrier member 300, the connector 400 will move to engage with a side of the hitch pin 210. In examples where present, the extension 222 is also sized such that for a given force and/or amount of deformation of the barrier member 300, the connector 400 will move relative to the hitch pin 210 such that the extension 222 either hooks into the wall of the passage 402, or hooks over an end of the passage 402 to mechanically engage with the outer surface of the connector 400 (as shown in FIG. 7) to therefore act as a barrier preventing the connector 400 from moving past the extension 222, and hence in the second configuration the coupling 400 and barrier member 300 are prevented from being lifted free of the first support member 200 by virtue of the connection between the hitch pin 210 and connector 400.

The barrier member 300 may be made of a resilient material such that, after the load 700 is removed, the barrier 300 resumes (or approximately resumes) its previous shape. Hence the connector 400 will move back into a position in which it is spaced apart from the hitch pin 210 such that it resumes the first configuration.

Hence there is provided a dock gate barrier system with a catch configured to be self locking in the event of an impact, for example an impact from a vehicle.

The configuration of the connector 400 and barrier system 300 is such that the dock gate barrier system is operable to be opened (as shown in FIG. 1) and closed (as shown in FIG. 4) without the need to disengage a catch or lock. Indeed, in the first mode of operation, when the barrier system is in the first configuration, the barrier member 300 and first support member 200 (i.e. connector 400 and hitch pin 210) are not locked together. Rather, in the first configuration, the hitch pin 210 is located in, but not locked to, the connector 400. It is only when a bending load 700 is applied to the barrier to deform it along its length, that the hitch pin 210 and connector 400 become engaged.

Thus a dock gate barrier system according to the present disclosure provides a solution which is inherently safer than those of the prior art as no positive action by the user is required to lock or unlock the barrier.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A dock gate barrier system, the dock gate barrier system comprising:

a barrier member comprising a first end and a second end with a central axis extending therebetween along a length of the barrier member, the barrier member further comprising a coupling, which defines a coupling passage with an inlet; and a first support member, from which extends a hitch pin, which extends along a longitudinal axis, the hitch pin configured to enter the coupling passage at the inlet and extend into the coupling passage, wherein the hitch pin and the coupling passage are configured such that:

in a first configuration, the hitch pin is operable to be entered into, and withdrawn from, the coupling passage; and in a second configuration, in response to a load being applied to the barrier member causing it to bend along its central axis, the hitch pin is engaged with the coupling to thereby lock the coupling relative to the hitch pin and thereby lock the barrier member to the first support member, wherein relative positions of the hitch pin and the coupling passage in the first configuration is different to the relative positions of the hitch pin and the coupling passage in the second configuration; and wherein the coupling is pivotable relative to the hitch pin around the longitudinal axis of the hitch pin to thereby change the relative positions of the hitch pin and coupling passage.

2. The dock gate barrier system as claimed in claim 1, wherein the coupling is operable, in response to the load being applied to the barrier member, to move, relative to the hitch pin, in a direction at an angle to the longitudinal axis of the hitch pin, to thereby change the relative positions of the hitch pin and the coupling passage.

3. The dock gate barrier system as claimed in claim 1, wherein the hitch pin is fixed relative to the first support member.

4. The dock gate barrier system as claimed in claim 1, wherein the coupling is fixed relative to the barrier member.

5. The dock gate barrier system as claimed in claim 1, wherein:

the coupling passage of the coupling extends from the inlet to an outlet on the coupling.

6. The dock gate barrier system as claimed in claim 5, wherein the hitch pin comprises:

a head end; and a stem portion, which extends along the longitudinal axis from the head end;

wherein the head end comprises an extension that overhangs the stem portion such that:

in the first configuration, a relative position of the coupling passage and the extension is such that the extension is operable to be entered into, and withdrawn from, the coupling passage; and in the second configuration, the extension is engaged with the coupling to thereby prevent the hitch pin from being withdrawn from the coupling passage.

7. The dock gate barrier system as claimed in claim 6, wherein in the second configuration the extension is operable to engage with the coupling around the outlet to prevent the coupling from moving past the extension, and thereby prevent the hitch pin from being withdrawn from the coupling.

8. The dock gate barrier system as claimed in claim 6, wherein in the second configuration, the extension is operable to hook onto the coupling to prevent the head end of the hitch pin from moving past the outlet, and thereby prevent the hitch pin from being withdrawn from the coupling.

9. The dock gate barrier system as claimed in claim 6, wherein the coupling passage is larger than:

the hitch pin stem portion; and the head end of the hitch pin.

10. The dock gate barrier system as claimed in claim 1, wherein:

in the first configuration, a clearance fit is maintained between the hitch pin and the coupling passage.

11. The dock gate barrier system as claimed in claim 1, wherein:

in the second configuration, a side of the hitch pin frictionally engages with a side of the coupling passage.

12. The dock gate barrier system as claimed in claim 1, wherein the hitch pin extends from a stop/rest, and the stop/rest extends from the first support member, and wherein the stop/rest is operable for the barrier member to rest upon.

13. The dock gate barrier system as claimed in claim 1, further comprising:

a second support member, which is spaced apart from the first support member, wherein the barrier member is pivotably mounted to the second support member at its second end such that the barrier member is operable to:

pivot relative to the second support member to move the first end of the barrier member towards the first support member and enter the hitch pin in the coupling passage; and pivot relative to the second support member to move the first end of the barrier member away from the first support member to withdraw the hitch pin from the coupling passage.

14. The dock gate barrier system as claimed in claim 1, wherein:

the first support member comprises a pair of spaced apart posts, the barrier member and the hitch pin being located between the posts, and the barrier operable to be located between the two posts; and/or the second support member comprises a pair of spaced apart posts, the barrier member being pivotably mounted to one or more of the second support member posts.

15. The dock gate barrier system as claimed in claim 1 further comprising:

a handrail, pivotably coupled to the barrier member, and coupled to the barrier member:

such that, in a condition where the barrier member is pivoted relative to the second support member, the handrail remains parallel to the barrier member;

such that, in a condition where the barrier member is pivoted away from the first support member, the distance between the handrail and barrier member reduces; and such that, in a condition where the barrier member is pivoted toward the first support member, the distance between the handrail and barrier member increases.

* * * * *